(12) United States Patent
Daub

(10) Patent No.: US 9,282,367 B2
(45) Date of Patent: Mar. 8, 2016

(54) VIDEO SYSTEM WITH VIEWER ANALYSIS AND METHODS FOR USE THEREWITH

(71) Applicant: ViXS Systems, Inc., Toronto (CA)

(72) Inventor: Sally Jean Daub, Toronto (CA)

(73) Assignee: ViXS Systems, Inc., Toronto (CA)

( * ) Notice: Subject to any disclaimer, the term of this patent is extended or adjusted under 35 U.S.C. 154(b) by 12 days.

(21) Appl. No.: 14/217,819

(22) Filed: Mar. 18, 2014

(65) Prior Publication Data

US 2015/0271548 A1  Sep. 24, 2015

(51) Int. Cl.
| | | |
|---|---|---|
| H04N 21/44 | (2011.01) | |
| H04H 60/33 | (2008.01) | |
| H04H 60/45 | (2008.01) | |
| H04H 60/47 | (2008.01) | |
| H04N 21/41 | (2011.01) | |
| H04N 21/4223 | (2011.01) | |
| H04N 21/4415 | (2011.01) | |
| H04N 21/45 | (2011.01) | |
| H04N 21/442 | (2011.01) | |
| H04N 21/454 | (2011.01) | |
| H04N 21/458 | (2011.01) | |
| H04N 21/81 | (2011.01) | |

(52) U.S. Cl.
CPC ......... *H04N 21/44008* (2013.01); *H04H 60/33* (2013.01); *H04H 60/45* (2013.01); *H04H 60/47* (2013.01); *H04N 21/4126* (2013.01); *H04N 21/4223* (2013.01); *H04N 21/4415* (2013.01); *H04N 21/44218* (2013.01); *H04N 21/454* (2013.01); *H04N 21/458* (2013.01); *H04N 21/4532* (2013.01); *H04N 21/812* (2013.01)

(58) Field of Classification Search
CPC ............... H04N 21/4415; H04N 21/44218
USPC ..................................... 725/9, 12
See application file for complete search history.

(56) References Cited

U.S. PATENT DOCUMENTS

| | | | |
|---|---|---|---|
| 6,446,261 | B1 | 9/2002 | Rosser |
| 7,698,236 | B2 | 4/2010 | Cox et al. |
| 2012/0072936 | A1 | 3/2012 | Small et al. |
| 2012/0324492 | A1* | 12/2012 | Treadwell et al. ............. 725/10 |
| 2014/0195328 | A1 | 7/2014 | Ferens et al. |

* cited by examiner

*Primary Examiner* — Olugbenga Idowu
(74) *Attorney, Agent, or Firm* — Garlick & Markison; Bruce E. Stuckman

(57) ABSTRACT

A system includes a viewer sensor that generates sensor data for sensing one or more viewers of a video display device. A viewer analysis module analyzes the sensor data to generate viewer data. A selection module selects selected content based on the viewer data and generates selected content data based on the selected content for display to the viewer or viewers via the video display device or via a mobile device associated with the viewer or viewers.

9 Claims, 7 Drawing Sheets

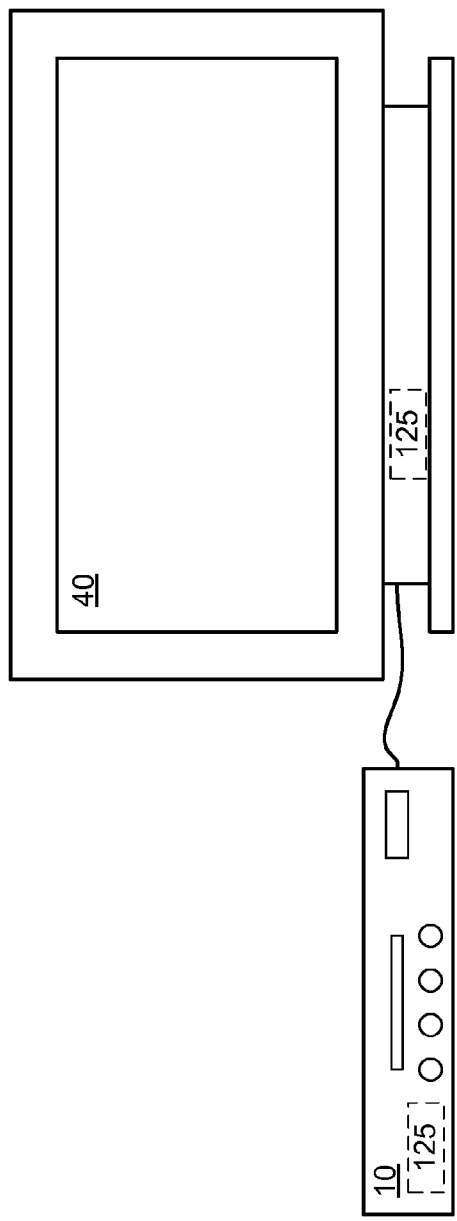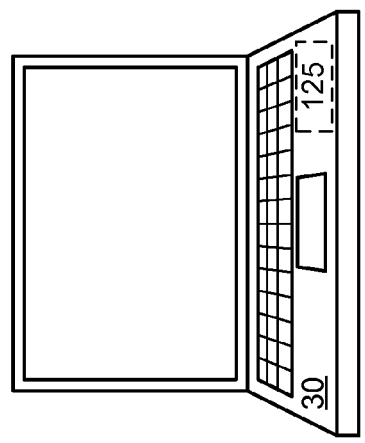

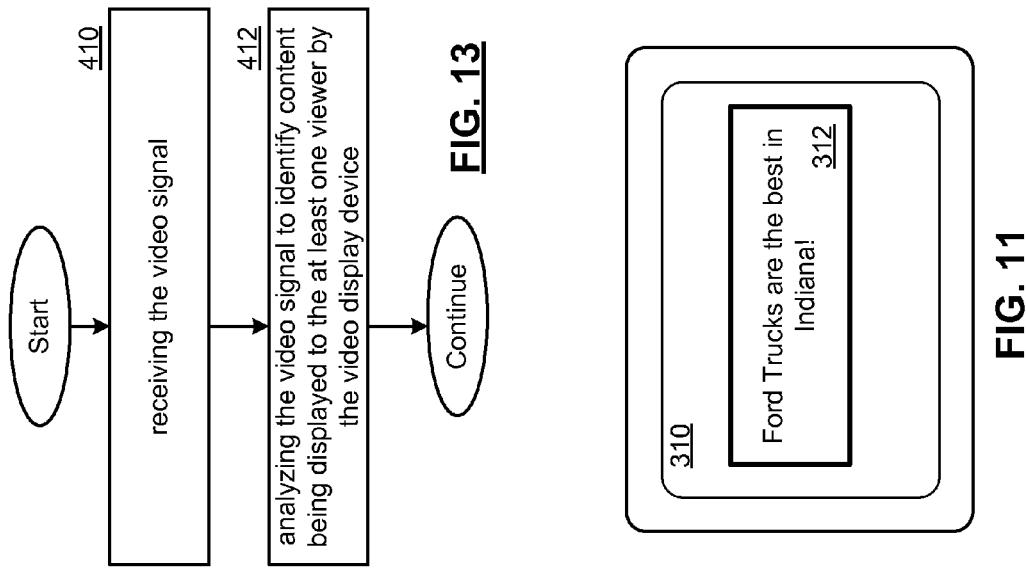
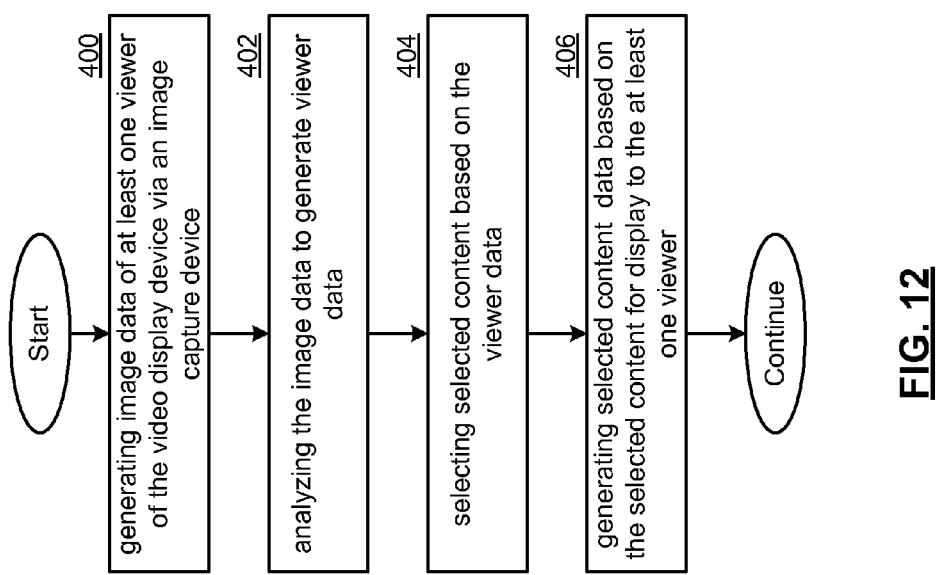

VIDEO SYSTEM WITH VIEWER ANALYSIS AND METHODS FOR USE THEREWITH

TECHNICAL FIELD

The present disclosure relates to systems that process and display video signals and provide adaptive video content including targeted advertisements.

DESCRIPTION OF RELATED ART

Advertisements are included in many video delivery systems. In particular, broadcast television providers have used both national and local advertisements and the associated revenue to pay for the cost of providing free video broadcasts. Similarly, satellite, cable and Internet-based television services include national and local advertisements. With the advent of streaming video services, other advertising mechanisms come into play. Some free streaming services and content providers also use advertisements to defray the costs associated with providing video streams. Paid and premium streaming video services may or may not include advertisements.

One consideration in any advertising system is whether the advertisements presented are reaching the correct audience. Advertisers seek to target their advertisements to an audience that is receptive to the subject of the advertisements.

BRIEF DESCRIPTION OF THE SEVERAL VIEWS OF THE DRAWINGS

FIGS. 1-3 present pictorial diagram representations of various video devices in accordance with embodiments of the present disclosure.

FIG. 11 presents a graphical representation of a screen display in accordance with an embodiment of the present disclosure.

FIG. 12 presents a flowchart representation of a method in accordance with an embodiment of the present disclosure.

FIG. 13 presents a flowchart representation of a method in accordance with an embodiment of the present disclosure.

DETAILED DESCRIPTION

FIGS. 1-3 present pictorial diagram representations of various video devices in accordance with embodiments of the present disclosure. In particular, device 10 represents a set top box with or without built-in digital video recorder functionality or a stand-alone digital video player such as an internet video player, Blu-ray player, digital video disc (DVD) player or other video player. Device 20 represents a tablet computer, smartphone or other communications device. Device 30 represents a laptop, netbook 20 or other portable computer. Device 40 represents a video display device such as a television or monitor.

The devices 10, 20, 30 and 40 each represent examples of electronic devices that incorporate one or more elements of a system 125 that includes features or functions of the present disclosure. While these particular devices are illustrated, system 125 includes any device or combination of devices that is capable of performing one or more of the functions and features described in conjunction with FIGS. 4-15 and the appended claims.

Figure 4:
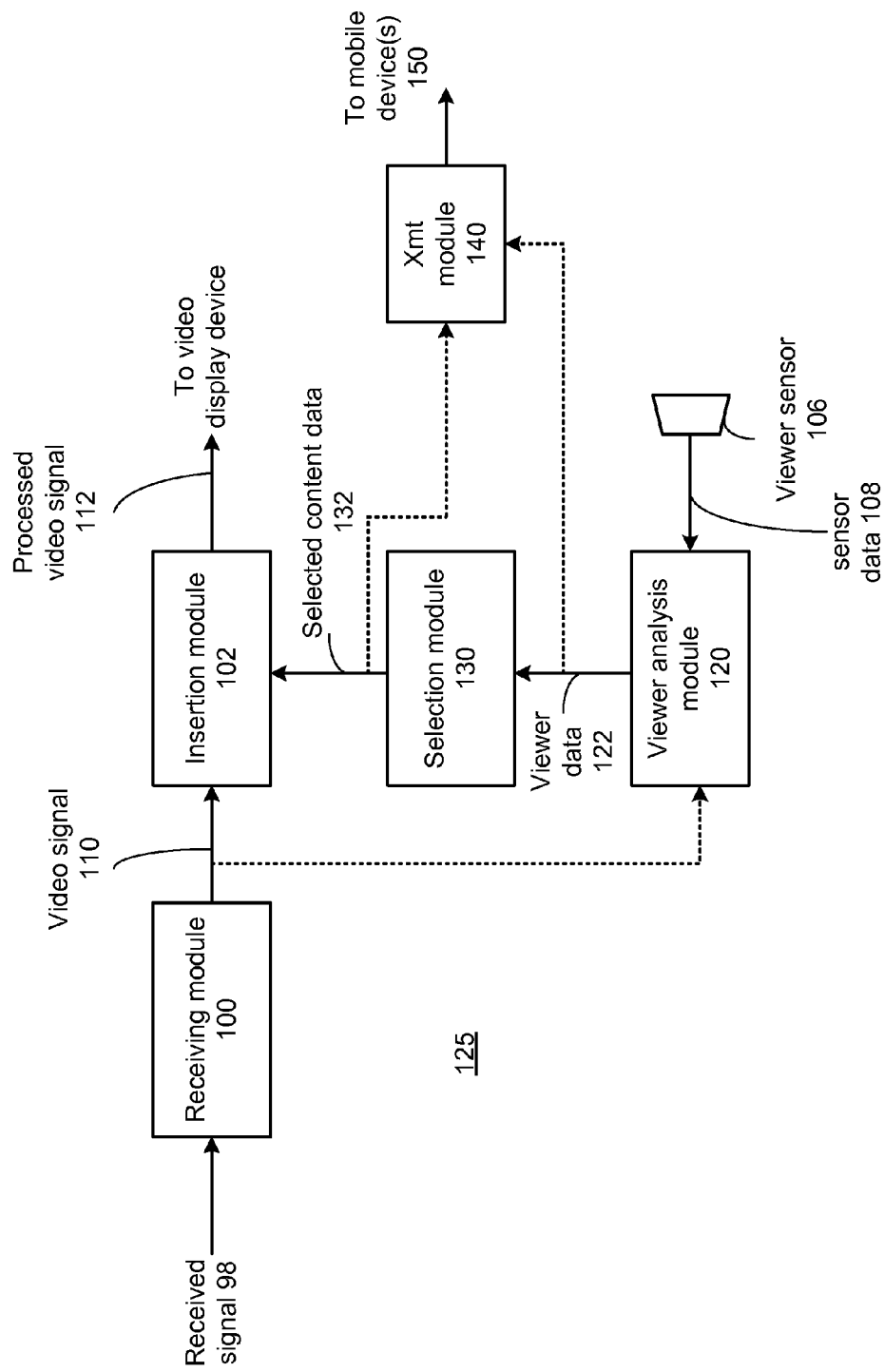
FIG. 4 presents a block diagram representation of a system in accordance with an embodiment of the present disclosure.

FIG. 4 presents a block diagram representation of a system in accordance with an embodiment of the present disclosure. In particular, this system includes a receiving module 100, such as a television receiver, cable television receiver, satellite broadcast receiver, broadband modem, 3G or 4G transceiver or other information receiver or transceiver that is capable of receiving a received signal 98 and extracting one or more video signals 110.

In an embodiment of the present disclosure, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Received signal 98 can include a compressed digital video signal complying with a digital video codec standard such as H.264, MPEG-4 Part 10 Advanced Video Coding (AVC), VC-1, H.265, or another digital format such as a Motion Picture Experts Group (MPEG) format (such as MPEG1, MPEG2 or MPEG4), QuickTime format, Real Media format, Windows Media Video (WMV) or Audio Video Interleave (AVI), high definition media interface (HDMI), digital video interface (DVI), etc. When the received signal 98 includes a compressed digital video signal, the receiving module can include a decoder or other video codec for decompressing the received signal 98 to produce a video signal suitable for display by video display device such as device 40, a video display device associated with devices 20 or 30 or other video display device that creates an optical image stream either directly or indirectly, such as by projection.

In an embodiment, the received video signal 98 is scrambled or encrypted and the receiving module operates to descramble and/or decrypt the received signal 98 to produce the video signal 110.

In operation, a viewer sensor 106 generates sensor data 108 of one or more viewers of the video display device. The viewer sensor 106 can include a digital camera such as a still or video camera that is either a stand-alone device, or is incorporated in any one of the devices 10, 20, 30 or 40 or other device that generates sensor data 108 in the form of image data. In addition or in the alternative, the viewer sensor 106 can include an infrared sensor, thermal imager, background temperature sensor or other thermal sensor, an ultrasonic sensor or other sonar-based sensor, a proximity sensor, an audio sensor such as a microphone, a motion sensor, brightness sensor, wind speed sensor, humidity sensor and/or other sensor for generating sensor data 108 that can be used by viewer analysis module 120 for determining the presence of viewers, for identifying particular viewers and/or for characterizing their activities.

A viewer analysis module 120 analyzes the sensor data 108 to generate viewer data 122. In an embodiment, the viewer analysis module 120 analyzes the sensor data 108 to generate viewer data 122 that indicates a number of viewers that are present, an identification of the viewer or viewers present and/or for characterizing their activities.

In addition, the viewer analysis module 120 optionally receives the video signal 110 and identifies content in the video signal being displayed to the viewer or viewers by the video display device. For example, the identified content can include: a theme associated with a scene in the content being displayed, an object presented in the content being displayed, a character presented in the content being displayed, and/or a background, scene, setting, or other characteristic of the content. In this case, the viewer analysis module 120 can analyze the image data to generate viewer data 122 that indicates a level of viewer is interest in the content being displayed.

A selection module 130 selects content to be presented to the viewer(s) such as one or more selected advertisements or ancillary content associated with the content of the video signal based on the viewer data 122 and generates selected content data 132 based on the selected content for display to the viewer or viewers. The selection module 130 can select the selected content advertisement(s) based on the identification of the number of viewers, based on the identification of the at least one viewer, and/or based on the viewer interest in the content being displayed.

In an embodiment, an insertion module 102 inserts the selected content data 132 in the video signal 110 to generate a processed video signal 112 for display to the viewer or viewers by displaying the processed video signal 112 via the video display device the viewer or viewers are watching. The selected content data 132 can be inserted as a local ad insert or other advertising insert in the video signal 110. In addition or in the alternative, the selected content data 132 can be inserted as an overlay, such as a split screen, banner, pop-up window or other mode. The selected content data 132 can include a still image or a video clip and be interactive or non-interactive.

In another mode of operation, the system includes a transmit module 140 that transmits the selected content data 132 to a mobile device or devices 150 associated with the viewer or viewers. In this case, the selected advertisement or other content is displayed to the viewer or viewers by displaying the selected content data 132 via the mobile device(s) 150. The transmit module 140 can be a wide area network device, a wireless local area network device, a personal area network device or other network device that communicates with the mobile device via the Internet, a wireless cellular protocol such as a 3G or 4G wireless protocol, an 802.11 protocol, a Bluetooth or ZigBee protocol or other wireless protocol.

In accordance with a previous example, the viewer analysis module 120 analyzes the image data to generate viewer data 122 that indicates an identification of the viewer or viewers that are watching and further retrieves a communication address associated these viewers. The selection module 130 can select customized advertisements or other content for each of the viewers that are identified as watching in the viewer data 122 and/or based on each viewer's level of interest in particular content of the video signal 110. The transmit module 140 receives the viewer data 122 that indicates the communication address associated the viewer or viewers and the customized advertisements or other content as selected content data 132 from the selection module 130. The transmit module 140 transmits the selected content data 132 to the mobile device(s) 150 associated with the viewer(s) based on their communication address(es). The selected content data 132 can be transmitted as a text message, email, social media message or post, such as Facebook or Twitter post or other electronic message, as a video stream or other media signal or as other video or media.

Consider an example where a family is watching TV. One or more video cameras are stand-alone devices or are built into the TV, a set top, Blu-Ray player, or mobile devices associated with the viewers. The camera or cameras capture video of the presentation environment and viewers. The system 125 processes the video and detects from it if there are viewers' present, how many viewers are present, which viewer or viewers are present (e.g. father, mother, son or daughter in the household). The system 125 processes the video and detects viewers' concentration/interest points based on tracking the viewer's head position and/or eye movements. The system 125 determines temporally which parts of video viewers are more interested in, (e.g. a theme such as dining in a restaurant, or a Caribbean vacation), and/or spatially which parts or objects on the screen viewers are more interested in (e.g. people characters, decoration of the room, a book on the desk). Based on the information above, the system 125 either alone or in conjunction with a service provider, may dynamically adjust the content and provide more information on subjects viewers are more interested in. For example, system 125 can operate temporally during ad time, to select/adjust ads based on the interests and/or may simultaneously provide more information, using a pop-up window on part of the screen or use another separate display device.

While the forgoing description has primarily focused on the use of system 125 in devices 10, 20, 30 or 40, it should be noted that portions of system 125 can be implemented via a cable headend, cable modem termination system, digital subscriber line multiplexer, network edge device, streaming video server or other server or other network element in communication with a device 10, 20, 30 or 40 via a cable network, subscriber line network, optical network, broadband wireless network, the Internet or other network. In particular, one or more functions of selection module 130, insertion module 102, transmit module 140 and/or viewer analysis module 120 can be implemented upstream in the network. In this embodiment, the sensor data 108 is transmitted upstream in the network and the processed video signal 112 can be transmitted downstream to a video display device that contains a receiving module 100 associated with a video display device.

Further embodiments including several optional functions and features are presented in conjunction with FIGS. 5-15 that follow.

Figure 5:
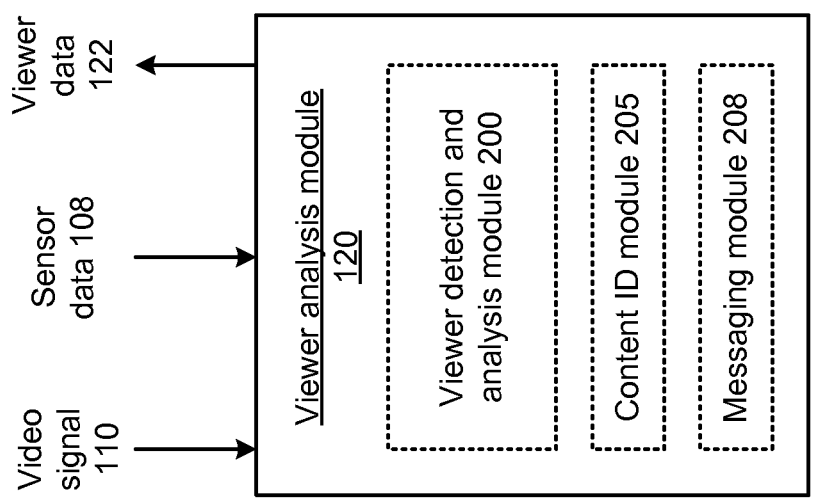
FIG. 5 presents a block diagram representation of a viewer analysis module in accordance with an embodiment of the present disclosure.

FIG. 5 presents a block diagram representation of a viewer analysis module in accordance with an embodiment of the present disclosure. In particular, a viewer analysis module 120 is presented that includes a viewer detection and analysis module 200 and a content identification module 205.

A viewer analysis module 120 analyzes the sensor data 108 to generate viewer data 122. In an embodiment, the viewer detection and analysis module 200 analyzes the sensor data 108 to generate viewer data 122 that indicates a number of viewers that are present, an identification of the viewer or viewers present and further to determine the viewer's level of interest in the content being displayed.

In one mode of operation, the viewer detection and analysis module 200 analyzes sensor data 108 in the form of image data together with a skin color model used to roughly partition face candidates. The viewer detection and analysis module 200 identifies and tracks candidate facial regions over the plurality of images and detects a face in the image based on the one or more of these images. For example, viewer detection and analysis module 200 can operate via detection of colors in the image data. The viewer detection and analysis module 200 generates a color bias corrected image from image data and a color transformed image from the color bias corrected image. The viewer detection and analysis module 200 then operates to detect colors in the color transformed image that correspond to skin tones. In particular, viewer detection and analysis module 200 can operate using an elliptic skin model in the transformed space such as a $C_bC_r$ subspace of a transformed $YC_bC_r$ space. In particular, a parametric ellipse corresponding to contours of constant Mahalanobis distance can be constructed under the assumption of Gaussian skin tone distribution to identify a facial region based on a two-dimension projection in the $C_bC_r$ subspace. As exemplars, the 853,571 pixels corresponding to skin patches from the Heinrich-Hertz-Institute image database can be used for this purpose, however, other exemplars can likewise be used in broader scope of the present disclosure.

In an embodiment, the viewer detection and analysis module 200 tracks candidate facial region over the plurality of images and detects a facial region based on an identification of facial motion in the candidate facial region over the plurality of images. The facial motion can include eye movement, mouth movement and/or other head or body movements. For example, face candidates can be validated for face detection based on the further recognition by viewer detection and analysis module 200 of facial features, like eye blinking (both eyes blink together, which discriminates face motion from others; the eyes are symmetrically positioned with a fixed separation, which provides a means to normalize the size and orientation of the head), shape, size, motion and relative position of face, eyebrows, eyes, nose, mouth, cheekbones and jaw. Any of these facial features can be used extracted from the image data and used by viewer detection and analysis module 200 to eliminate false detections.

Further, the viewer detection and analysis module 200 can employ temporal recognition to extract three-dimensional features based on different facial perspectives included in the plurality of images to improve the accuracy of the recognition of the face. Using temporal information, the problems of face detection including poor lighting, partially covering, size and posture sensitivity can be partly solved based on such facial tracking. Furthermore, based on profile view from a range of viewing angles, more accurate and 3D features such as contour of eye sockets, nose and chin can be extracted.

Based on the number of facial regions that are detected, the number of viewers present can be identified. In addition, the viewer detection and analysis module 200 can identify the particular viewers that are present by comparing the image data corresponding to each facial region to historical data collected by the viewer sensor 106 or to other captured pictures of the viewers generated from social media sites, or otherwise uploaded to the system 125 by the viewer's themselves. The identification of the detected faces can be based on an extraction of facial characteristic data such as shape, color, size and relative position of face, eyebrows, eyes, nose, mouth, cheekbones and jaw, skin texture and visual details of the skin (lines, patterns, and spots apparent in a person's skin). This can be used to generate viewer data 122 that specifically identifies the particular viewers that are present.

In addition, the identification of the specific viewers present can be used to retrieve a messaging address for each of these viewers stored in messaging module 208. In operation, the messaging module 208 retrieves a communication address associated these viewers. The messaging address can include a text message address, email address, social media message address or account or other electronic message address, a network address or other address.

The content identification module 205 receives the video signal 110 and identifies content in the video signal 110 being displayed to the viewer or viewers by the video display device. For example, the identified content can include: a theme associated with a scene in the content being displayed, an object presented in the content being displayed, and/or a character presented in the content being displayed, and/or a background, scene, setting, or other characteristic of the content that is identified temporally and/or spatially. Content identification module 205 can operate based on metadata retrieved from the video signal such as general metadata, time-coded metadata correlated to particular shots of video signal 110, or using detection and recognition techniques to extract content information from the video signal 110.

In addition to detecting and identifying the particular viewers, the viewer detection and analysis module 200 can further analyze the faces of the viewers to determine a level of interest in particular content. In an embodiment, the image capture device is incorporated in the video display device such as a TV or monitor or is otherwise positioned so that the position and orientation of the viewers with respect to the video display device can be detected. In an embodiment, the orientation of the face is determined to indicate whether or not the viewer is facing the video display device. In this fashion, when the viewer's head is down or facing elsewhere, the viewer's level of interest in the content being displayed is low. Likewise, if the eyes of the viewer are closed for an extended period indicating sleep, the viewer's interest in the displayed content can be determined to be low. If, on the other hand, the viewer is facing the video display device and/or the position of the eyes and condition of the mouth indicate a heighten level of awareness, the viewer's interest can be determined to be high. In this fashion, temporal changes in interest for each of the viewers can be tracked and correlated to the particular content being displayed to determine for what subject matter the particular viewers are interested. For example, viewer data 122 could indicate viewer interest in a vacation scene in a video program, a tire commercial or scenes that contain a particular actor or actress, etc.

In another mode of operation, the viewer detection and analysis module 200 can further analyze the faces of the viewers to correlate the viewers' attention to a particular spatial portion of the video display device. The particular orientation of the head and/or eye movements can be tracked temporally and spatially to determine a particular portion of the display screen that is of interest at a particular time. In this fashion, temporal/spatial changes in interest for each of the viewers can be tracked and correlated to the particular content being displayed to determine what subject matter the particular viewers are interested in. For example, the viewer data 122 can be generated to indicate that a particular viewer appears highly interested in a particular automobile when it appears, a painting that is in the background of a scene, a particular bottle of wine in a larger picture, etc.

Figure 6:
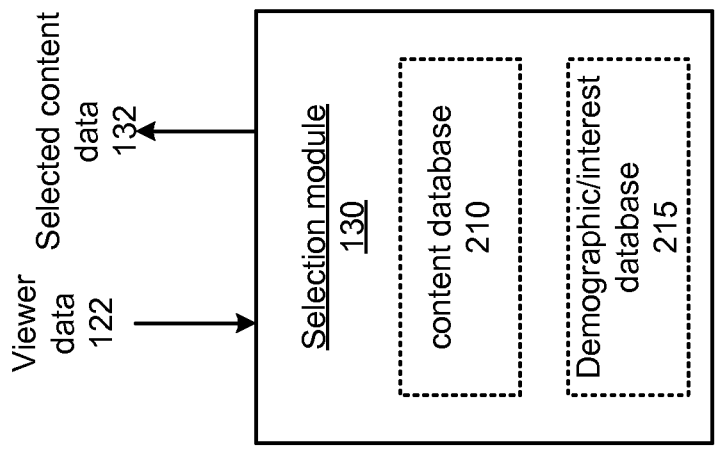
FIG. 6 presents a block diagram of a selection module in accordance with an embodiment of the present disclosure.

FIG. 6 presents a block diagram of a selection module in accordance with an embodiment of the present disclosure. In particular a selection module 130 is presented that receives viewer data 122 and generates selected content data 132 in response thereto. As previously discussed, the viewer data 122 can identify the particular viewer or viewers that are watching. The demographic/interest database 215 includes demographic data and/or other user data associated with potential viewers of the video display device. For example, demographic classifiers based on gender, age, income level, geographical location, ethnicity and/or culture can be used to classify a viewer's general interests. In addition, other indications of user interests gathered from social media sites, search engines, etailers, other Internet activities such as a contextual search history, a browser history and/or a service provider database can be gathered and used to categorize general viewer interests. In operation, the viewer or viewers identified in viewer data 122 as watching the current programming can be used to retrieve corresponding data on the demographics/interests of these viewers. In addition, the content specific interests indicated in viewer data 122 based on temporal/spatial tracking and level of interest can also be collected.

In operation, the selection module 130 operates to search the content database 210, based on the general interests retrieved from the demographic/interest database 215 and/or content specific interests indicated by the viewer data 122. Selected content data 132 in the form of targeted advertisements, supplemental content that is ancillary to the content that is presented, that is related to subject matter determined from the content presented or is otherwise related to the general interests or content specific interests can be identified by searching the content database 210. In one example, a father watching a football game may be presented with an advertisement for tires based on the father's demographics and general interests. A daughter watching a movie that contains Brad Pitt may be queried to see if she would like to access further information on the actor, based on her apparent interest in scenes that contain that actor. A mother who shows a level of interest in a particular cooking appliance in a Food Network program could be presented an advertisement/and/or other information pertaining to that particular appliance.

Figure 7:
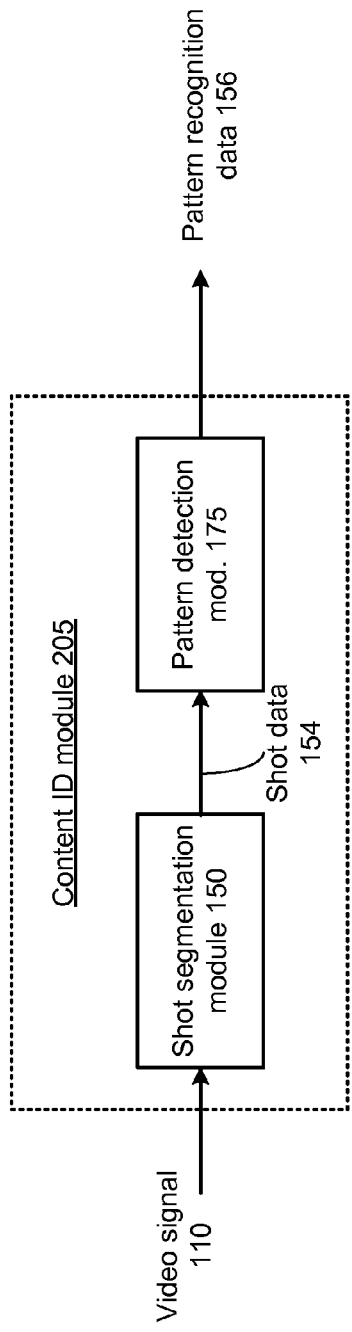
FIG. 7 presents a block diagram of a content identification module in accordance with an embodiment of the present disclosure.

FIG. 7 presents a block diagram representation of a content identification module in accordance with a further embodiment of the present disclosure. As shown, the content identification module 205 includes a shot segmentation module 150 that segments the video signal 110 into shot data 154 corresponding to a plurality of shots. The pattern detection module 175 analyzes the shot data 154 and generates pattern recognition data 156 that identifies at least one pattern of interest in conjunction with at least one of the plurality of shots.

In an embodiment, shot segmentation module 150 segments the video signal 110 based on an analysis of picture variance, group of picture (GOP) structure and or other image statistics that indicate a change in shot. Consider an example where video signal 110 contains a video broadcast. Shot data 154 can indicate anchor shots and field shots shown alternately could indicate a news broadcast; crowd shots and sports shots shown alternately could indicate a sporting event. Based on their historical tracks, variance and/or motion cost can change dramatically when an abrupt shot transition happens. When variances keep changing monotonously and motion costs jump up and down at the start and end points of the monotonous variance changes, this indicates a gradual shot transition, like fade-in, fade-out, dissolve, and wipe.

In operation, the pattern detection module 175 operates via clustering, statistical pattern recognition, syntactic pattern recognition or via other pattern detection algorithms or methodologies to detect a pattern of interest in an image or images of video signal 110 and generates pattern recognition data 156 in response thereto. Pattern detection module 175 can detect or recognize features like sky, grass, sea, wall, buildings, moving vehicles and animals (including people).

Temporal feedback in the form of motion vectors retrieved in decoding (or motion information gotten by optical flow for very low resolution) can be used by pattern detection module 175 for motion-based pattern partition or recognition via a variety of moving group algorithms. Spatial information such as statistical information, like variance, frequency components and bit consumption estimated from input YUV or retrieved for input streams, can be used for texture based pattern partition and recognition by a variety of different classifiers. More recognition features, like structure, texture, color and motion characters can be used for precise pattern partition and recognition. For instance, line structures can be used to identify and characterize manmade objects such as building and vehicles. Random motion, rigid motion and relative position motion are effective to discriminate water, vehicles and animals respectively.

In addition to analysis of static images included in the shot data 154, shot data 154 can include a plurality of images in the video signal, and the pattern detection module 175 can generate the pattern recognition data 156 based on a temporal recognition performed over a plurality of images within a shot. Slight motion within a shot and aggregation of images over a plurality of shots can enhance the resolution of the images for pattern analysis, can provide three-dimensional data from differing perspectives for the analysis and recognition of three-dimensional objects and other motion can aid in recognizing objects and other features based on the motion that is detected.

Pattern recognition data 156 can include a text string that indicates information relating to a theme (e.g. relating to sports or cooking), certain scenes (e.g. a man and a woman on a beach), other subject matter (e.g. regarding the American Civil War), a venue (e.g. the Eiffel Tower), certain objects (e.g. a Patek Phillipe watch), other general themes (e.g. romance, action, horror), and/or other information detected such as the presence and location of certain people, features, objects, backgrounds, etc. The pattern recognition data 156 can further contain temporal and spatial information that indicates the temporal information and spatial location of the identified pattern of interest in the video signal 110. The operation of the pattern detection module 175 can be described in conjunction with the following additional examples.

In one example of operation, the pattern detection module 175 identifies and tracks a candidate facial region over the plurality of images and detects a face in the image based on the one or more of these images. In an embodiment, the pattern detection module 175 can operate similarly to viewer detection and analysis module 200 with regard to these particular functions. In addition, shot transitions in shot data 154 can be used to start a new series of face detecting and tracking. The face detected by the pattern detection module 175 on the shot data 154 can be identified as corresponding to a person of interest, such as an actor or other famous person, based on a via clustering, statistical pattern recognition, syntactic pattern recognition or via other pattern detection algorithms or methodologies.

In a further example of operation, the pattern detection module 175 generates pattern recognition data 156 via text recognition. In this fashion, text data such as automobile license plate numbers, store signs, building names, subtitles, name tags, and other text portions in the shot data 154 can be detected and recognized. Text regions typically have obvious features that can aid detection and recognition. These regions have relatively high frequency; they usually have high contrast in a regular shape; they are usually aligned and spaced equally; they tend to move with background or objects. In this mode of operation, the pattern detection module 175 generates pattern recognition data 156 that can include an indication that text was detected, a location of the region of text. The pattern recognition module 175 can operate via a trained hierarchical and fuzzy classifier, neural network and/or vector processing engine to recognize text in a text region and to generate text strings based on the recognition of the text in the text region.

In another example of operation, the pattern detection module 175 generates pattern recognition data 156 via recognition of human action. In this fashion a region of human action can be determined along with the determination of human action descriptions such as a number of people, body sizes and features, pose types, position, velocity and actions such as kick, throw, catch, run, walk, fall down, loiter, drop an item, etc. can be detected and recognized. In this mode of operation, the pattern detection module 175 generates pattern recognition data 156 that can include an indication that a human was detected, a location of the region of the human and that includes, for example human action descriptors and correlates the human action to a corresponding video shot. The pattern detection module 175 can subdivide the process of human action recognition into: moving object detecting, human discriminating, tracking, action understanding and recognition. In particular, the pattern detection module 175 can identify a plurality of moving objects in the plurality of images. For example, motion objects can be partitioned from the background. The pattern detection module 175 can then discriminate one or more humans from the plurality of moving objects. Human motion can be non-rigid and periodic. Shape-based features, including color and shape of face and head, width-height-ratio, limb positions and areas, tile angle of human body, distance between feet, projection and contour character, etc. can be employed to aid in this discrimination. These shape, color and/or motion features can be recognized as corresponding to human action via a classifier such as neural network. The action of the human can be tracked over the images in a shot and a particular type of human action can be recognized in the plurality of images. Individuals, presented as a group of corners and edges etc., can be precisely tracked using algorithms such as model-based and active contour-based algorithm. Gross moving information can be achieved via a Kalman filter or other filter techniques. Based on the tracking information, action recognition can be implemented by Hidden Markov Model, dynamic Bayesian networks, syntactic approaches or via other pattern recognition algorithm.

Figure 8:
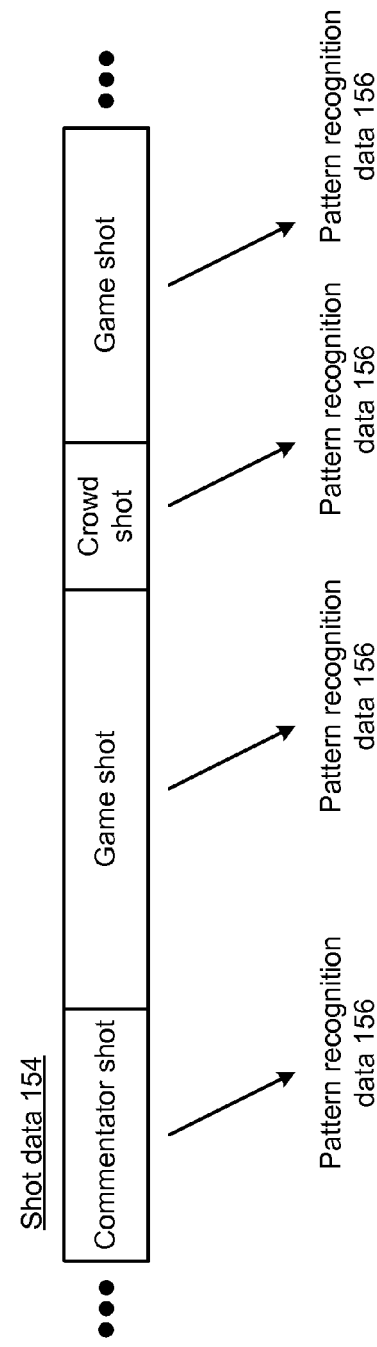
FIG. 8 presents a temporal representation of shot data in accordance with an embodiment of the present disclosure.

FIG. 8 presents a temporal representation of shot data in accordance with an embodiment of the present disclosure. In this example, a video signal includes an image sequence of a sporting event such as a football game that is processed by shot segmentation module 150 into shot data 154. The shot data 154 indicates a first shot in the temporal sequence is a commentator shot, the second and fourth shots are shots of the game and the third shot is a shot of the crowd.

As discussed in conjunction with FIG. 7, the pattern detection module 175 analyzes the shot data 154 in the four shots, based on the images included in each of the shots to recognize the first shot as being a commentator shot, the second and fourth shots as being shots of the game and the third shot as being a shot of the crowd.

The pattern detection module 175 generates pattern recognition data 156 in conjunction with each of the shots that identifies the first shot as being a commentator shot, the second and fourth shots as being shots of the game and the third shot is being a shot of the crowd. The pattern recognition data 156 can be correlated to the shot data 154 to identify the location of each shot in the image sequence and to identify each shot within the corresponding pattern of recognition data 156, and optionally to identify a region within the shot by image and/or within one or more images that include the identified subject matter.

Figure 9:
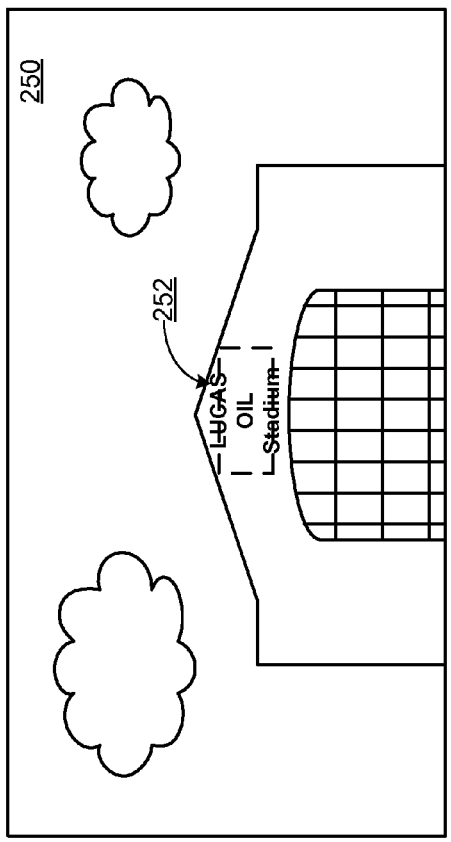
FIG. 9 presents a graphical representation of a picture in accordance with an embodiment of the present disclosure.

FIG. 9 presents a graphical representation of a picture in accordance with an embodiment of the present disclosure. In particular, an example image of video signal 110 is shown that includes a portion of a particular football stadium as part of a video broadcast of a football game. In accordance with this example, pattern detection module 175 generates pattern recognition data 156 that indicates that text is present and region identification data that indicates that region 252 contains the text in this particular image. The pattern detection module 175 operates based on this region 252 and optionally based on other accumulated regions that include this text to generate further pattern recognition data 156 that includes the recognized text string, "Lucas Oil Stadium".

Figure 10:
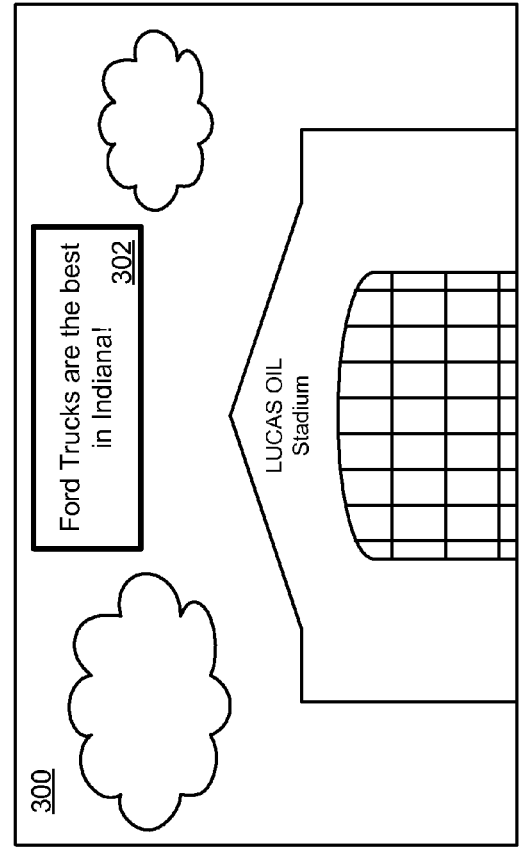
FIG. 10 presents a graphical representation of a screen display in accordance with an embodiment of the present disclosure.

FIG. 10 presents a graphical representation of a screen display in accordance with an embodiment of the present disclosure. In particular, a screen display is presented in conjunction with a video display device used in conjunction with system 125 described in conjunction with FIG. 4.

In this example, a video signal 110 is being presented on a video display device. A viewer sensor 106 such as an image capture device is incorporated in the video display device and generates sensor data 108 in the form of image data of a viewer of the video display device. The viewer analysis module 120 analyzes the image data to generate viewer data 122 that identifies the viewer as the father of the household. In an embodiment, the viewer analysis module 120 further determines that the viewer is actively viewing the video display device.

A selection module 130 determines that the identified viewer is a 52-year old male that is part of a demographic that likes trucks, that owns a truck that is 12 years old and that has been looking at new trucks online over the past 30 days. The selection module selects an advertisement relating to Ford trucks that includes pop-up 302 that is inserted in the video signal 110. As shown, an image 300 includes the pop-up 302 overlaid on the image 300 of the video signal 110.

FIG. 11 presents a graphical representation of a screen display in accordance with an embodiment of the present disclosure. In particular, a screen display 310 is presented in conjunction with a mobile device 150 used in conjunction with system 125 described in conjunction with FIG. 4.

In this example, a video signal 110 is being presented on a video display device. A viewer sensor 106 incorporated in the video display device generates sensor data 108 of a viewer of the video display device. The viewer analysis module 120 analyzes the sensor data 108 to generate viewer data 122 that identifies the viewer as the father of the household. In an embodiment, the viewer analysis module 120 further determines that the viewer is actively viewing the video display device and retrieves a communication address associated with the father's mobile device 150.

A selection module 130 determines that the identified viewer is a 52-year old male that is part of a demographic that likes trucks, that owns a truck that is 12 years old and that has been looking at new trucks online over the past 30 days. The selection module selects an advertisement 312 relating to Ford trucks. The transmit module 140 receives advertisement 312 as selected content data 132 and further receives a communication address for the father's mobile device 150 in viewer data 122. The advertisement 312 is transmitted to the father's mobile device 150 and is displayed on display screen 310.

FIG. 12 presents a flowchart representation of a method in accordance with an embodiment of the present disclosure. In particular, a method is presented for use in with one or more features described in conjunction with FIGS. 1-11. Step 400 includes generating image data of at least one viewer of the video display device via an image capture device. Step 402 includes analyzing the image data to generate viewer data. Step 404 includes selecting selected content based on the viewer data. Step 406 includes generating selected content data based on the selected content for display to the at least one viewer.

In an embodiment, the viewer data indicates a number of viewers that are present and/or indicates an identification of the at least one viewer. The selected content can be selected in step 404 based on the identification of the at least one viewer.

FIG. 13 presents a flowchart representation of a method in accordance with an embodiment of the present disclosure. In particular, a method is presented for use in with one or more features described in conjunction with FIGS. 1-12. Step 410 includes receiving the video signal. Step 412 includes analyzing the video signal to identify content being displayed to the at least one viewer by the video display device. Viewer data can be generated to indicate viewer interest in the content being displayed. Selected content can be selected based on the viewer interest in the content being displayed. Step 412 can include identifying at least one of: a theme associated with a scene in the content being displayed, an object presented in the content being displayed, and a character presented in the content being displayed.

Figure 14:
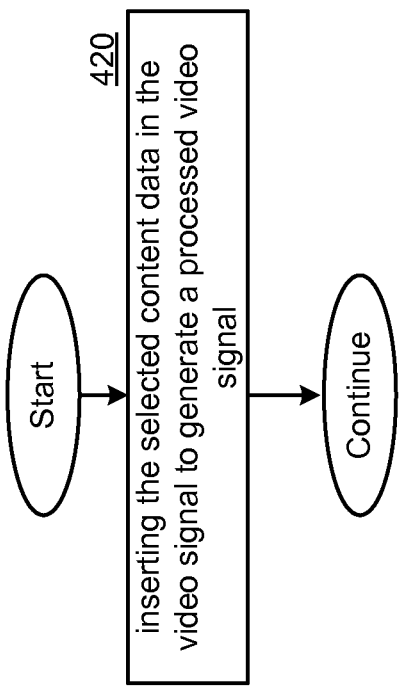
FIG. 14 presents a flowchart representation of a method in accordance with an embodiment of the present disclosure.

FIG. 14 presents a flowchart representation of a method in accordance with an embodiment of the present disclosure. In particular, a method is presented for use in with one or more features described in conjunction with FIGS. 1-13. Step 420 includes inserting the selected content data in the video signal to generate a processed video signal. The selected content can be displayed to the at least one viewer by displaying the processed video signal via a video display device.

Figure 15:
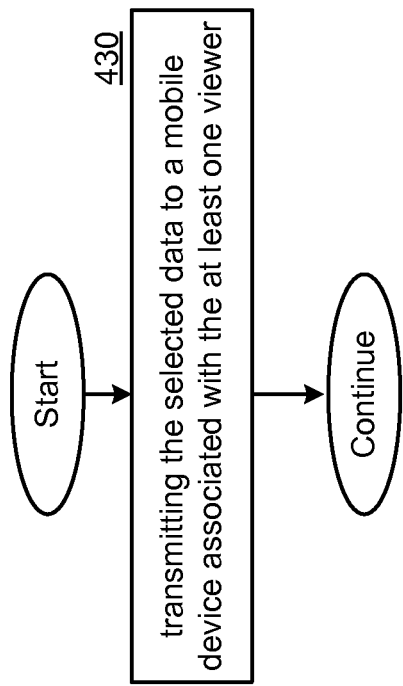
FIG. 15 presents a flowchart representation of a method in accordance with an embodiment of the present disclosure.

FIG. 15 presents a flowchart representation of a method in accordance with an embodiment of the present disclosure. In particular, a method is presented for use in with one or more features described in conjunction with FIGS. 1-14. Step 430 includes transmitting the selected content data to a mobile device associated with the at least one viewer. The selected content is displayed to the at least one viewer by displaying the selected content data via a mobile device.

In an embodiment, the viewer data indicates an identification of the at least one viewer and further indicates a communication address associated with the at least one viewer. The selected content is selected based on the identification of the at least one viewer, and the selected content data is transmitted to the mobile device associated with the at least one viewer based on the communication address.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A system for use with a video display device that displays a video signal, the system comprising:
    a viewer sensor that generates sensor data for sensing at least one viewer of the video display device;
    a viewer analysis module, coupled to the image capture device, that analyzes the sensor data to generate viewer data, wherein analyzing the sensor data includes recognizing the at least one viewer, tracking eye movements of the at least one viewer to determine a concentration point of the at least one viewer in a spatial portion of an image contained in the video signal, recognition of an object that appears in the spatial portion of the image corresponding to the concentration point of the at least one viewer and determining interest of the at least one viewer in the object based on analysis of facial characteristics of the at least one viewer; and
    a selection module, coupled to the viewer analysis module, that selects selected content based on the viewer data and generates selected content data based on the selected content for display to the at least one viewer;
    wherein recognizing the at least one viewer includes comparing the sensor data to a captured image of the at least one viewer from a social media site to identify the at least one viewer;
    wherein the viewer analysis module generates the viewer data to indicate an identification of the at least one viewer and a social media address of the at least one viewer for the social media site;
    wherein the selection module selects the selected content based on the identification of the at least one viewer;
    wherein a transmit module transmits the selected content data to a mobile device associated with the at least one viewer via the social media address; and
    wherein the selected content is displayed to the at least one viewer by displaying the selected content data via the mobile device.

2. The system of claim 1 wherein the viewer analysis module analyzes the sensor data to generate the viewer data that indicates a number of viewers that are present.

3. The system of claim 1
    wherein the selection module selects the selected content based on the viewer interest in the content being displayed.

4. The system of claim 3 wherein the viewer analysis module further identifies at least one of: a theme associated with a scene in the content being displayed, and a character presented in the content being displayed.

5. The system of claim 1 further comprising:
    an insertion module, coupled to the video display device and the selection module, that inserts the selected content data in the video signal to generate a processed video signal;
    wherein the selected content is displayed to the at least one viewer by displaying the processed video signal via the video display device.

6. The system of claim 1 wherein the viewer sensor includes an image capture device and the sensor data includes image data.

7. A method for use with a video display device that displays a video signal, the method comprising:
    generating image data of at least one viewer of the video display device via an image capture device;
    analyzing the image data to generate viewer data, wherein analyzing the image data includes recognizing the at least one viewer, tracking eye movements of the at least one viewer to determine a concentration point of the at least one viewer in a spatial portion of an image contained in the video signal, recognition of an object that appears in the spatial portion of the image corresponding to the concentration point of the at least one viewer and determining interest of the at least one viewer in the object based on analysis of facial characteristics of the at least one viewer;

selecting selected content based on the viewer data; and
generating selected content data based on the selected content for display to the at least one viewer;
wherein recognizing the at least one viewer includes comparing the sensor data to a captured image of the at least one viewer from a social media site to identify the at least one viewer;
wherein the viewer data indicates an identification of the at least one viewer and a social media address of the at least one viewer for the social media site;
wherein the selected content is selected based on the identification of the at least one viewer;
wherein the selected content data is transmitted to a mobile device associated with the at least one viewer via the social media address; and
wherein the selected content is displayed to the at least one viewer by displaying the selected content data via the mobile device.

8. The method of claim 7 wherein the viewer data indicates a number of viewers that are present.

9. The method of claim 7 further comprising:
inserting the selected content data in the video signal to generate a processed video signal;
wherein the selected content is displayed to the at least one viewer by displaying the processed video signal via the video display device.

* * * * *